Patented Nov. 29, 1949

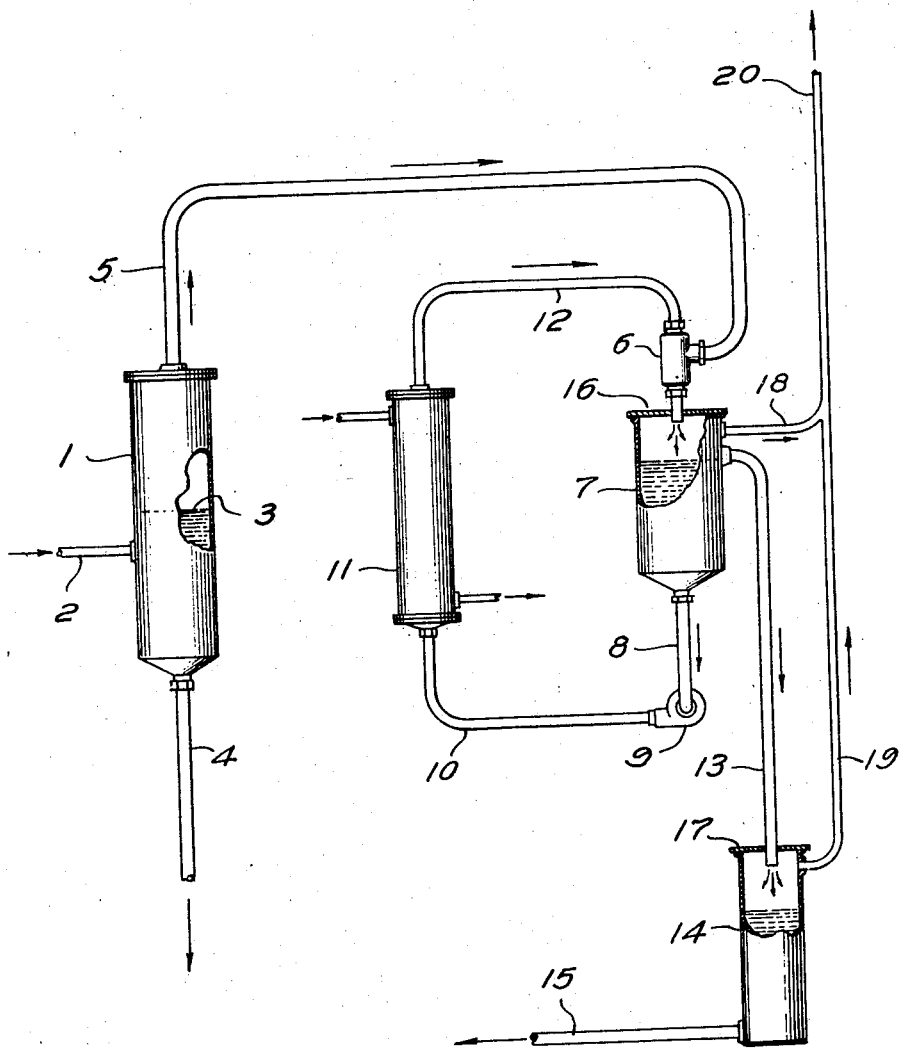

2,489,703

UNITED STATES PATENT OFFICE 2,489,703

EVAPORATING AQUEOUS SOLUTIONS CONTAINING HCN

Lucien H. Cook, Jackson Heights, and William J. Rosenbloom, White Plains, N. Y., assignors to American Cyanamid Company, New York, N. Y., a corporation of Maine Application April 24, 1947, Serial No. 743,672

2 Claims. (Cl. 202—52)

This invention relates to the precipitation of soluble solid material from solution. More particularly, it is concerned with an improved procedure for evaporating and/or cooling solutions of soluble material when such solutions also contain one or more components which are more volatile than the principal solvent.

In commercial operation, the problem of precipitating soluble material from solution is frequently encountered. Often these solutions are warm or hot and frequently they have a high solute content. Two general approaches to the problem have been employed. Possibly the simplest consists in reducing the temperature to a level at which a considerable proportion of the solute becomes insoluble. The other consists in concentrating the solution by solvent removal until the desired amount of solute has been thrown from solution.

Both general approaches are subject to certain drawbacks. For example, direct cooling may be used only when the temperature and solute content of the solution are high enough. Even when applicable there is the problem of precipitating or crystallizing solids in the cooler. Not only does this interfere with efficient heat transfer but eventually results in clogging the apparatus. Except in special cases, therefore, concentration by solvent removal is preferred to simply reducing the temperature of the solution.

Where the nature of the solution is such that it can be handled in ordinary equipment, concentration by simple evaporation usually offers no serious problems, even in those cases in which adding heat is undesirable. In many industries it is practiced on enormous scales by procedures ranging from open air evaporation in pools or pans to the use of complicated vacuum evaporators. The latter have a particular advantage in obtaining solid products from warm or hot solutions in that they cool as well as evaporate.

In general, however, unheated vacuum evaporation procedures are limited to the treatment of solutions which do not contain components which must be recovered but are more volatile than the solvent. The presence of such components quite complicates the problem. If the solution contains a component which will flash to a vapor, non-condensible at the pump temperature and pressure, it will bind an ordinary liquor-sealed rotary vacuum pump. Other types of mechanical vacuum pumps are too large, unwieldy and expensive to install and maintain. Their use is generally impractical. Particularly is this true if the solution, or the vapors therefrom, are corrosive.

When the volatile component is neither valuable nor dangerous, there still is no serious problem. In such cases a steam, air or water eductor may be used and the discharge sent to waste. Where, for reasons of intrinsic value or because of disposal problems, the volatile component must be recovered or retained in the system this cannot be done.

In practice, this problem of recovering solids from solutions which contain one or more components more volatile than the solvent but cannot be discharged to the sewer is encountered. Such solutions often are corrosive and/or produce corrosive vapors. Often, too, because the problem is encountered in conjunction with other operations as part of a whole process in heat balance, the addition of heat during evaporation is undesirable.

It is, therefore, the principal object of the present invention to provide a procedure whereby concentrated solutions, containing a valuable, corrosive, volatile substituent, may be simultaneously evaporated and cooled without being subject to excessive mechanical difficulties and without introducing additional gases, water or heat into the system. Such a procedure and an apparatus capable of carrying it out has a useful application not only in the ammonia recovery system noted above but in any system in which the solutions have similar objectionable features and in which the condensate contains a valuable, volatile, corrosive material which must be recovered.

In general, the objects of the present invention have been carried out by accumulating a body of condensate from the desired evaporation, cooling the condensate, and using the cooled condensate as motivating fluid for a jet eductor. The low-pressure connection of the eductor is directly connected with the space above the solution which it is desired to evaporate and/or cool.

In the copending application for U. S. Letters Patent, Serial No. 743,671, filed of even date, by William J. Rosenbloom, one of the present inventors, is shown, as a problem incident to the production of HCN, a process of recovering ammonia from a gaseous mixture including NH₃ and HCN. The NH₃ is taken up as a salt, usually the sulfate. Absorption is carried out under conditions such that the used absorbing liquor is nearly saturated with the ammonium salt and is at a temperature about 25°–35° F. below its boiling point.

The solution is so highly corrosive that it cannot be handled in equipment of any ordinary structural material. Since the solution is already hot, cooling is desirable to increase the amount of salt thrown from solution. The circuit is part of a system in heat balance so that adding heat to evaporate solvent is undesirable. Cooling by heat exchange is impractical because precipitated salts foul the exchanger surfaces and eventually clog its passages. Further, HCN is much more volatile than water and any attempt to apply vacuum to obtain combined evaporation and cooling results in vaporizing all the HCN in addition to a portion of the water. Even though the original HCN content of the solution may be quite low, this readily produces enough non-condensible vapor to lock the usual types of liquid-sealed rotary pumps. Other mechanical pumps, due to size, cost, upkeep, power consumption or corrosion are impractical.

Since the HCN is both valuable and dangerous, it must be retained in the system, an eductor, as normally discharged to waste is impractical. An attempt to produce vacuum with a steam or water eductor is not desirable because it dilutes the HCN condensate with a diluent which must be removed to recover the HCN. An air or gas jet eductor carries off the HCN.

The operation is therefore an excellent example of that type of difficult problem with which the present invention is concerned. In discussing the present invention, it will be illustrated in conjunction therewith. The invention also may be more readily described with reference to the accompanying drawing which illustrates diagrammatically a simple flowsheet embodying the features of the invention.

As shown in the drawing, the elements of the flowsheet are quite simple. A vacuum evaporator-crystallizer, generally designated 1, is provided with a side-arm inlet 2 through which liquor to be evaporated is delivered from any suitable source to maintain an approximately constant liquid level indicated at 3. Concentrated solution containing suspended solute, or supersaturated therewith, leaves the bottom of evaporator 1 through a suitable conduit 4, which in turn is usually, but not necessarily, the top of a conventional barometric leg. So far as the present invention is concerned, this slurry passes from the system. It is taken to some conventional type of apparatus such as a filter, centrifuge or the like in which the solids content is removed, making the solids-free liquor available for reuse.

The top of evaporator 1 is connected through a suitable vapor conduit 5 to a side-arm of a jet eductor 6. Fluid for operation of eductor 6 is obtained through a circulating system comprising condensate storage tank 7, conduit 8 through which condensate is drawn by pump 9, conduit 10 through which condensate is delivered to a cooler 11 and conduit 12 through which cold condensate is delivered from the cooler to the liquid inlet of eductor 6. The discharge from the eductor is delivered into tank 7. Tank 7 is provided with an overflow discharge conduit 13. Condensate overflowing through conduit 13 is collected and stored in a suitable storage tank 14. From tank 14 it may be withdrawn for reuse as desired, through conduit 15, as, for example, in the overall circuit of the above-identified co-pending application S. N. 743,671, being used to recover HCN in another part of the system.

Since there will be some HCN in the vapors above the condensate in tanks 7 and 14, for protection of personnel, these are fitted with loose covers 16 and 17 respectively and are vented through conduits 18, 19 and 20 to some vent condenser system not a part of the present invention and usually common to this and other parts of the whole operation.

The operation of the invention is believed to be apparent from the foregoing. Cold condensate being pumped through the cooler and the internal jet of eductor 6 produces a vacuum in conduit 5 and therefore in the space above the liquor in evaporator 1. As a result of the application of this vacuum, evaporation occurs at liquor-vapor interface 3 in evaporator 1 resulting in both concentration and cooling of the liquor in the evaporator. The combined evaporation and cooling throws part of the solute out of solution. In jet eductor 6, cold liquid from conduit 12 mingles with and condenses vapors entering eductor 6 through conduit 5. In starting up, sufficient water is placed in tank 7 to operate the closed circuit. After operation is instituted this is gradually replaced by condensate.

A marked feature of the invention is that it requires no apparatus not usually employed in ordinary operations. By use of the novel circuit, the usual condenser is employed as a condensate cooler, but the vacuum pump has been replaced by a simple pressure pump which cannot be vapor locked in operation. This pump may be of any desired standard type although a centrifugal or rotary type is generally preferable to a piston type. Where useful vacuum pumps of sufficiently corrosion-resistant material cannot be obtained, suitable pressure pumps are available. Last but not least, a liquid pressure pump, as used in the present invention, is comparatively small as compared with the vacuum pump which would be required to produce the same partial pressure in evaporator 1. The liquor pump may have as little as 0.01 to 0.005 of the power consumption necessary with vacuum pump capable of obtaining equivalent results in use.

It is also an advantage of the system that it has no essential capacity limitations, i. e., solution need not be fed to nor slurry withdrawn from evaporator-cooler 1 at any fixed rates. It is only necessary to provide sufficient capacity of the maximum flows. If the vacuum produced by the eductor is such that it produces a predetermined partial pressure of solvent above the solution, when evaporation has concentrated and cooled the liquor into equilibrium therewith, no further evaporation will occur.

We claim:

1. A continuous process, adapted to remove solvent from a solution containing at least one dissolved solid and one dissolved component more volatile than the principal solvent, which comprises partially filling an enclosed space with a body of said solution; applying vacuum to the vapor space above said body, whereby vapor is formed in said enclosed space in equilibrium with the liquid at the pressure in said space; maintaining said vacuum sufficiently high that at said equilibrium at least a portion of said solvent and substantially all of said more volatile component are in the vapor phase in equilibrium with the solvent containing a very low content of more volatile component in the liquid phase; establishing a second body of liquid; continuously withdrawing and cooling liquid from said second body, using said cooled liquid as motivating fluid in forming said vacuum and removing said vapors from said space with a fluid-operated jet eductor, whereby motivating fluid and vapors mingle and the vapors condense; adding the fluid-condensate liquid to said second body; overflowing liquid in excess of a predetermined volume from said second body and from said cooling-condensing operations; continuously removing concentrated liquor from a low level in said first body of solution, and introducing additional solution to be concentrated into said first body at a higher level therein, but below the surface thereof, said additional solution being added to said first body at a rate sufficient to maintain the volume of said first body substantially constant.

2. A continuous concentrating process, adapted to remove water from an aqueous solution comprising water, HCN, a salt-forming acid and the ammonium salt of said acid, which comprises partially filling an enclosed space with a body of such solution; applying vacuum to the vapor space above said body, whereby vapors form in said enclosed space in equilibrium with the liquid at the pressure in said space; maintaining said vacuum sufficiently high that at least a portion of the water and substantially all of the HCN are in the vapor phase in equilibrium with water containing a very low HCN content in the liquid phase; establishing a second body of liquid; continuously withdrawing and cooling liquid from said second body, using said cooled liquid as motivating fluid in forming said vacuum and removing said vapors from said space with a fluid-operated jet eductor, whereby motivating fluid and vapors mingle and the vapors condense; adding the fluid-condensate liquid to said second body; overflowing liquid in excess of a predetermined volume from said second body and from said cooling-condensing operations; continuously removing concentrated liquor from a low level in said first body of solution, and continuously introducing additional solution to be concentrated into said first body at a higher level therein, but below the surface thereof, in amount sufficient to maintain the volume of said solution body substantially constant.

LUCIEN H. COOK.
WILLIAM J. ROSENBLOOM.

REFERENCES CITED

The following references are of record in the file of this patent:

UNITED STATES PATENTS

| Number | Name | Date |
|---|---|---|
| 1,920,307 | Hechenbleikner | Aug. 1, 1933 |
| 1,969,793 | Hechenbleikner | Aug. 14, 1934 |
| 2,088,003 | Sperr | July 27, 1937 |
| 2,302,253 | Reichel et al. | Nov. 17, 1942 |
| 2,388,328 | Jacocks | Nov. 6, 1945 |
| 2,419,225 | Mitchell | Apr. 22, 1947 |